United States Patent [19]

Mackay

[11] 4,165,569
[45] Aug. 28, 1979

[54] HYDRIDE STORAGE AND HEAT EXCHANGER SYSTEM AND METHOD

[75] Inventor: Donald B. Mackay, Spanish Fork, Utah

[73] Assignee: Billings Energy Corporation, Provo, Utah

[21] Appl. No.: 883,905

[22] Filed: Mar. 6, 1978

Related U.S. Application Data

[60] Division of Ser. No. 781,371, Mar. 25, 1977, abandoned, which is a continuation of Ser. No. 570,268, Apr. 21, 1975, abandoned.

[51] Int. Cl.$^2$ .......................... F26B 5/04; F17C 11/00
[52] U.S. Cl. ............................................ 34/15; 62/48
[58] Field of Search ............... 62/48; 34/15; 123/1 A, 123/DIG. 12

[56] References Cited
U.S. PATENT DOCUMENTS 3,732,690  5/1973  Meijer .................................. 123/1 A Primary Examiner—Ronald C. Capossela
Attorney, Agent, or Firm—Criddle, Thorpe & Western

[57] ABSTRACT

A hydride storage and heat exchanger system includes a container having a generally circular cross-section for holding a hydride material, apparatus for introducing hydrogen gas into and receiving hydrogen gas from the container, and apparatus for conveying a heat exchange medium into contact with the container to enable exchange of heat between the hydride material and the medium. The conveying apparatus is adapted to apply the heat exchange medium to the container in such a manner that any material disposed at a certain radial distance and cross-section in the container will be substantially the same distance from the heat exchange medium as any other hydride material disposed at that same radial distance and cross-section in the container. The container may be generally cylindrical or frustoconical in shape and the conveying apparatus may be either a housing surrounding the container, a conduit extending through the container, or both.

6 Claims, 11 Drawing Figures

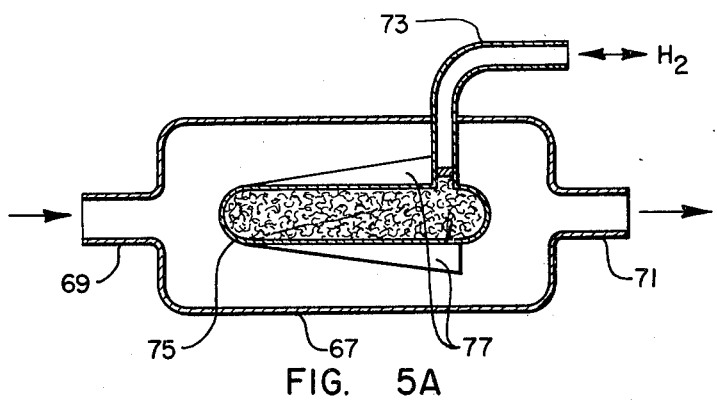
FIG. 5A
FIG. 5B
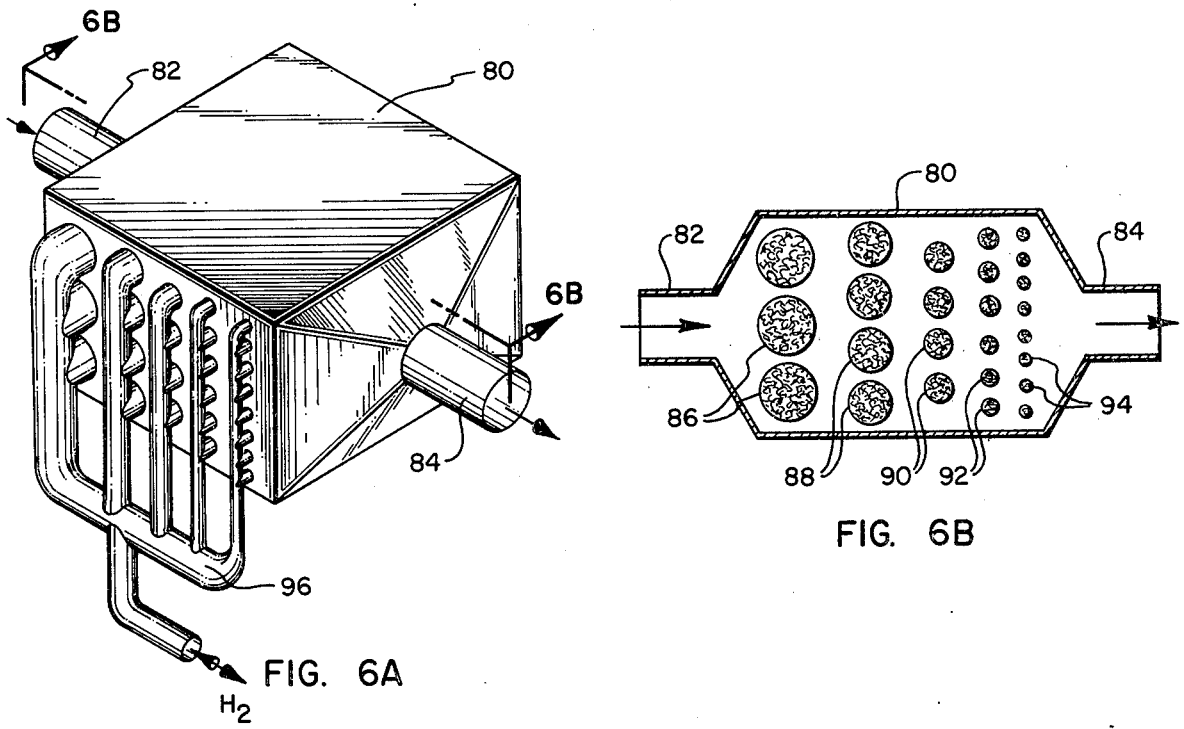
FIG. 6A
FIG. 6B
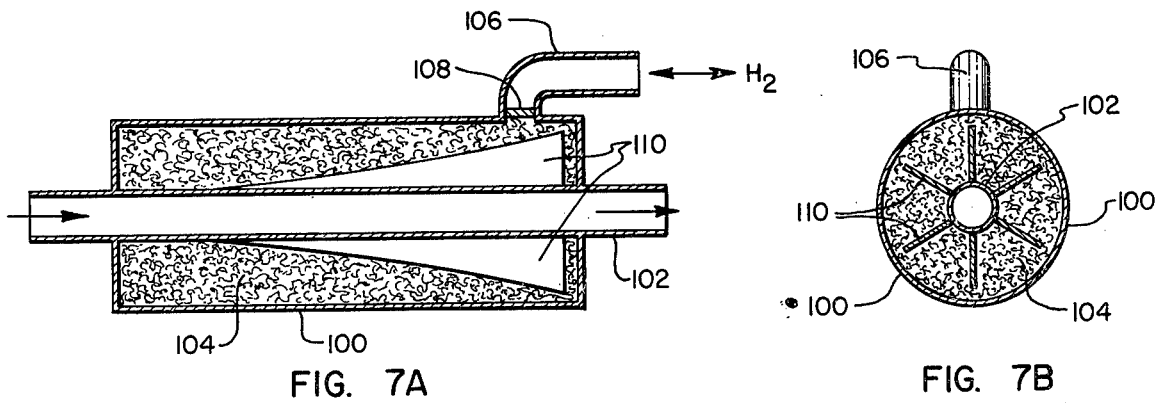
FIG. 7A
FIG. 7B

HYDRIDE STORAGE AND HEAT EXCHANGER SYSTEM AND METHOD

This is a division, of application Ser. No. 781,371 filed Mar. 25, 1977 abandoned, which was, in turn, a continuation of application Ser. No. 570,268, filed on Apr. 21, 1975 now abandoned.

BACKGROUND OF THE INVENTION

This invention relates to method and apparatus for storing hydrogen in and recovering hydrogen from a hydride material.

As a result of recent shortages in hydrocarbon fuels and the recognition that the supply of such fuels will ultimately be exhausted, there has been an increased interest in finding and developing alternative fuels. One alternative fuel whose potential has long been recognized but, as yet, has not been realized is hydrogen. The attractiveness of hydrogen as a fuel lies in the fact that it is one of the most abundant of all elements, that conventional internal combustion engines can be readily adapted to operate on hydrogen and in such operation, unlike gasoline, a large percentage of the hydrogen is converted to power the engines, and that the burning of hydrogen in such engines can be made to be relatively pollution free. See, for example, copending application, Ser. No. 554,533, filed Mar. 3, 1975, now U.S. Pat. No. 3,983,882. Of course, the potential of hydrogen as a fuel is not limited to internal combustion engines but also extends to industrial uses, use in fuel cells and in home and mobile home heaters, and to any situation where natural gas, propane gas, etc., is presently used.

One of the problems which has thus far prevented the widespread use of hydrogen as a fuel has been the difficulty in efficiently and safely storing the hydrogen. Storing hydrogen as a liquid is costly since it requires considerable power to liquify the hydrogen and transfer of the liquid from one container to another results in a loss to the atmosphere of much of the hydrogen. Also, containers for the liquid hydrogen must be extremely well insulated and sturdy to reduce the loss of hydrogen due to vaporization or boiling. Storing hydrogen as a gas requires extremely heavy and bulky containers and is impractical for most presently contemplated consumer uses.

The use of hydride material (hereinafter defined to mean any metals, metal compounds or other materials capable of absorbing and holding hydrogen) appears to be an attractive approach to the storage of hydrogen for consumer purposes. Exemplary hydride material includes iron titanium, misch-metal nickel, and columbium. Storage of hydrogen in the hydride material (sometimes referred to as hydrating the material) typically involves lowering the temperature of the hydride material and then applying hydrogen gas under pressure to the material. After the hydride material absorbs the hydrogen, the material is sealed in a container under pressure to maintain the material in the hydrated state until the hydrogen is needed at a subsequent time. Recovery or withdrawal of the hydrogen involves a process substantially opposite that used for storing the hydrogen, i.e., heating the hydride material and releasing some of the pressure of the container in which the hydride material is maintained.

Structure heretofore used for holding the hydride material and storing the hydrogen has typically included a storage container having a plurality of conduits running through the container. The hydride material is placed in the container and a heat exchange medium passed through the conduits either to cool the hydride material, when storing the hydrogen, or to heat the hydride material, when releasing the hydrogen. One of the problems with this type of structure, because of the geometry of the conduits relative to the hydride material, is that some of the hydride material is disposed in locations too far from the conduits to readily absorb or release hydrogen. That is, because the heat transfer path between the heat exchange medium and some hydride material is long, either the hydrogen will not be absorbed or released from such material, or the time required for such absorption or release is longer than desired. Of course, increasing the number of conduits helps but this also reduces the space available in the container for holding the hydride material and increases the weight and cost of construction of the container.

Another problem with the prior art containers arises from the increase in temperature (during hydrogen storage) or a decrease in temperature (during hydrogen release) as the heat exchange medium passes through the container. Specifically, the rate of heat exchange decreases as the heat exchange medium moves through the container so that for the hydride material near the exit end of the container, the rate of absorption and release of hydrogen will be reduced and may be too low for full utilization of such hydride material.

SUMMARY OF THE INVENTION

It is an object of the present invention to provide hydride storage and heat exchanger structures adapted to enable the efficient and rapid absorption and release of hydrogen by hydride material contained in the structure.

It is also an object of the present invention to provide such structures in which a heat exchange medium may be applied thereto to uniformly and evenly heat or cool the hydride material.

It is a further object of the present invention to provide such structures for confining hydride material in a container having a generally circular cross-section such that the material may be evenly and uniformly exposed to a heat exchange medium applied to the container.

It is another object of the present invention to provide such structures suitable for containing and withstanding high pressures using a minimum amount of material to construct the structures.

It is also an object of the present invention, in accordance with one aspect thereof, to provide a method and apparatus for exposing hydride material to a heat exchange medium in such a way that a continuously decreasing volume of hydride material is exposed to the heat exchange medium as the medium passes by the hydride material.

The above and other objects of the present invention are realized in a specific illustrative embodiment of a hydride storage and heat exchanger system which includes a container having a generally circular cross-section for holding hydride material, apparatus for introducing hydrogen gas into and receiving hydrogen gas from the container, and apparatus for conveying a heat exchange medium into proximity with the container to enable exchange of heat between the hydride material and the medium. The container and conveying apparatus are constructed so that hydride material disposed at a certain radial distance and cross-section in the container will be substantially the same distance from the heat exchange medium as any other hydride material disposed at that same radial distance and cross-section. Hydrogen gas is introduced into the container while a cooling medium is conveyed into proximity with the container and is withdrawn from the container when a heating medium is conveyed into proximity with the container. Alternative embodiments for conveying the heat exchange medium into proximity with the container include applying the medium to the exterior surface of the container, applying the medium to a conduit extending substantially through the center of the container, or both. In accordance with one aspect of the invention, the container for holding the hydride material is constructed so that the heat transfer path between the heat exchange medium and the hydride material decreases as the medium passes through or along the container.

BRIEF DESCRIPTION OF THE DRAWINGS

The above and other objects, features and advantages of the present invention can best be understood from the following detailed description presented in connection with the accompanying drawings in which:

FIGS. 5A and 5B show a side cross-sectional view and an end cross-sectional view respectively of an additional embodiment of a hydride storage and heat exchanger system;

FIGS. 6A and 6B show a perspective view and side cross-sectional view respectively of another embodiment of a hydride storage and heat exchanger system; and FIGS. 7A and 7B show a side cross-sectional view and an end cross-sectional view respectively of still a further embodiment of a hydride storage and heat exchanger system.

DETAILED DESCRIPTION

Figure 1:
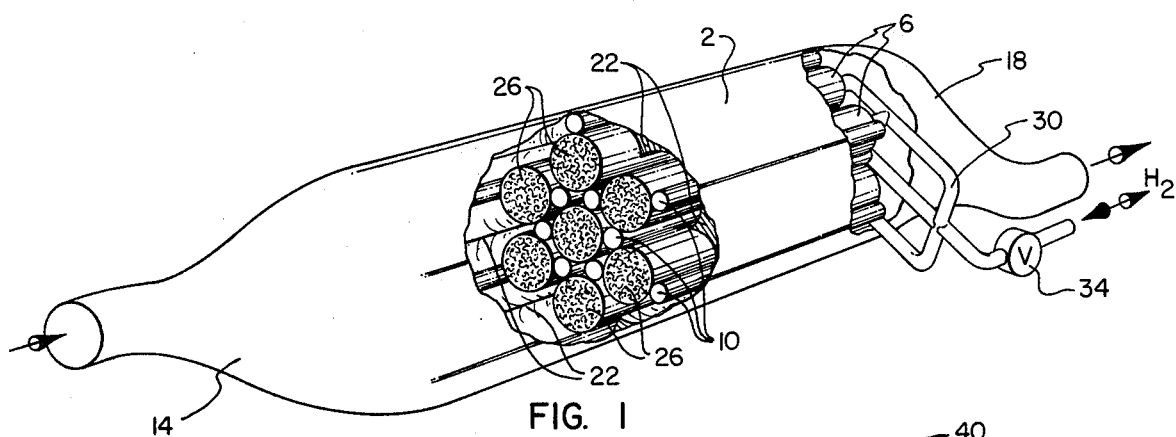
FIG. 1 shows a perspective, partially cut away view of a hydride storage and heat exchanger system made in accordance with the principles of the present invention.

In FIG. 1 there is shown a perspective, partially cut away view of one embodiment of a hydride storage and heat exchanger system, said embodiment including an elongated housing 2 in which are disposed a plurality of generally cylindrical (or frusto-conical) containers 6. The containers 6 are arranged in the housing 2 so that the cylindrical axes thereof are generally parallel. Also, the containers 6 are maintained in a spaced-apart relationship not only from each other but also from the walls of the housing 2 by a plurality of spacers 10. The spacers 10 advantageously are rings positioned between adjacent containers 6 and between the containers and the walls of the housing 2 as shown in FIG. 1. The purpose of the spacers is to allow free flow of heat exchange medium about the exterior of the containers 6. Such medium is introduced through an inlet manifold 14 to flow through the housing 2 and about the containers 6 and then out an oulet manifold 18, as generally indicated by the arrows.

Filler members 22 are spaced about the interior surface of the housing 2, one filler member being located between each adjacent pair of containers 6. The filler members 22 extend along the length of the container 2 and are formed to force heat exchange medium flowing through the housing 2 to pass close to the containers 6.

The containers 6 contain hydride material 26 suitable for absorbing and releasing hydrogen when cooled or heated respectively. Hydrogen gas is introduced into the containers 6 by way of a manifold 30 coupled through the housing 2 at the exit end thereof to the ends of the containers 6. The manifold 30 is simply coupled over openings in the ends of the containers 6 to allow hydrogen gas to be introduced through the manifold into the containers.

The above-described structure provides a simple, compact and efficient arrangement for the temporary storage of hydrogen. Storage is accomplished simply by introducing hydrogen gas into the manifold 30 while a heat exchange medium, such as, for example, water or air, is introduced into the inlet manifold 14 to flow through the housing 2 to contact the containers 6 and out the outlet manifold 18. The heat exchange medium absorbs heat released by the hydride material 26 as hydrogen is absorbed by the hydride material. When the hydrating process is completed, a valve 34 is closed to prevent escape of hydrogen until such time as the hydrogen is needed.

The provision of containers 6 having generally circular cross-sections facilitates the rapid exchange of heat between the heat exchange medium and the hydride material since the hydride material is uniformly and evenly exposed to the heat exchange medium. With the circular configuration, hydride material located at a certain radial distance and cross-section in the containers will be the same distance from heat exchange medium as all other hydride material located at the same radial distance and cross-section. The circular configuration also increases the pressure-withstanding capabilities of the containers.

Placement of the manifold 30 at the exit end of the housing 2 facilitates and enhances the absorption of hydrogen at the exit end of the containers 6 where otherwise the absorption would be more slow and incomplete because of the absorption of heat by the heat exchange medium as the medium moves toward the exit end. Introducing hydrogen to the containers 6 at the exit end enhances connective heat transfer through movement of the hydrogen so that more hydrogen is absorbed in spite of the temperature differential between the heat exchange and the hydride material being reduced at the exit end.

Figure 2:
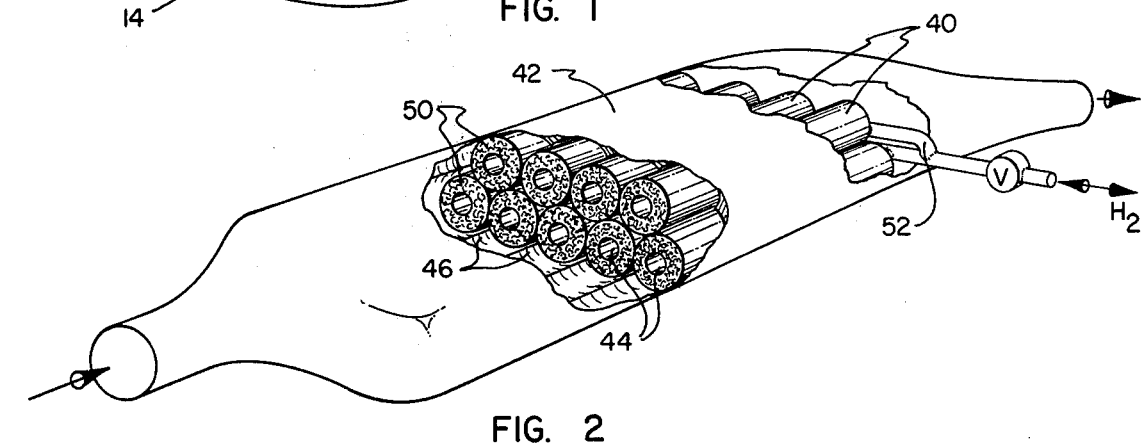
FIG. 2 shows a perspective, partially cut away view of an alternative embodiment of a system made in accordance with the principles of the present invention.

FIG. 2 shows a perspective, partially cut away view of another embodiment of a hydride storage heat exchanger system. This embodiment includes a plurality of containers 40 disposed in a housing 42. Each container 40 is generally cylindrical (or frusto-conical) in shape and is maintained in a close-packed relationship in contact with adjacent containers as shown in FIG. 2. Although the containers 40 are in a close-packed relationship, there exists spaces between adjacent containers and between the containers and the housing 42. Again, filler strips 46 may be provided on the interior surface of the housing 42 to project part way between adjacent containers 40.

As with the system of FIG. 1, heat exchange medium is introduced into the housing 42 to flow between and about the containers 40. However, each of the containers 40 includes a conduit or bore 44 extending through the center and along the length of the containers to also carry heat exchange medium. Hydride material 50 contained in the containers 40 is thus exposed to heat exchange medium flowing through the conduits 44 as well as to heat exchange medium circulating about the exterior of the containers. This enhances the absorption and the release of hydrogen from the hydride material.

The process of storing and recovering hydrogen with the FIG. 2 system is the same as that of the FIG. 1 system and includes the introduction of hydrogen gas into a manifold 52 coupled through the housing 42 at the exit end thereof over openings in the ends of the containers 40. As the hydrogen gas is introduced into the manifold 52 and containers 40, a cooling medium is passed about and through the containers 40 to absorb heat given off by the hydride material as it absorbs hydrogen. The withdrawal of hydrogen from the containers 40 involves the passing through and about the containers 40 of heating medium to cause the hydride material to release the hydrogen which is then withdrawn from the manifold 52.

Figures 3A, 3B:
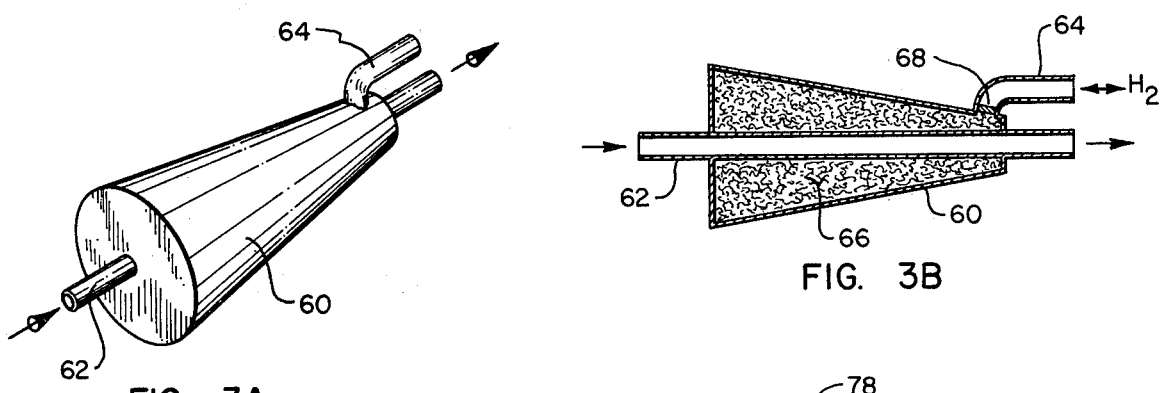
FIGS. 3A and 3B show a perspective view and side cross-sectional view respectively of another embodiment of a hydride storage and heat exchanger system.

Composite FIG. 3 shows still another embodiment of a hydride storage and heat exchanger system which includes a frusto-conical container 60 for holding hydride material 66. (When discussing frusto-conical configurations, it should be understood that sides of the containers could be contoured concave or convex—this will still be considered frusto-conical.) Extending through the containers 60 along the frusto-conical axis is a conduit 62 for carrying a heat exchange medium. The heat exchange medium is introduced into the left end of the conduit 62 to flow therethrough and out the right end of the conduit as indicated by the arrows in FIGS. 3A and 3B. Hydrogen gas is introduced into and withdrawn from the container 60 by way of a manifold 64 attached to the container 60 near the exit end. A filter 68 is disposed in the manifold 64 where the manifold is joined to the container 60 to prevent the hydride material 66 from being withdrawn from the container through the manifold. Although not specifically shown in FIGS. 1 and 2, the structure there would also include such filters where the respective manifolds were coupled to the hydride material containers.

As best seen in FIG. 3B, a greater volume of hydride material 66 is disposed about the conduit 62 near the inlet end than is disposed about the conduit near the outlet end. In other words, as the heat exchange medium passes through the conduit 62 from the inlet end to the outlet end, the average length of the heat transfer path from the medium to the hydride material 66 continuously decreases. Thus, even though the volume of the hydride material 26 is greater at the inlet end of the container 60, the temperature difference between the hydride material 66 and the heat exchange medium flowing through the conduit 62 is also greater, so that heat is readily exchanged between the material and the medium. As the medium passes through the conduit 62, this difference decreases because of the loss or gain of heat by the medium and thus, to compensate for this decrease in difference, the volume of the hydride material is decreased toward the outlet end of the container 60. With this configuration, less hydride material remains unused because the heat transfer between the material and the heat exchange medium is more balanced along the length of the container 60, i.e. absorption or release of hydrogen by the hydride material takes place and is completed at substantially the same time at each end and along the length of the container.

As with the other arrangements, hydrogen is stored in the FIG. 3 structure by introducing the hydrogen through the manifold 64 to the hydride material 66 while a cooling medium is passed through the conduit 62. Then, hydrogen may be withdrawn through the manifold 64 as a heating medium is passed through the conduit 62. Although only one container 60 and conduit 62 are shown, it may be desirable to have a plurality of such containers and conduits confined in a single housing similar to the arrangement of FIG. 2.

Figure 4:
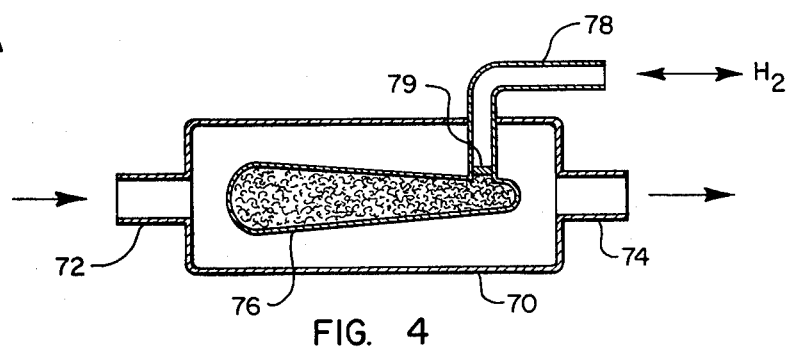
FIG. 4 shows a side cross-sectional view of still another embodiment of a hydride storage and heat exchanger system.

There is shown in FIG. 4 another embodiment of a hydride storage and heat exchanger system which also allows for exposure of a greater volume of hydride material to a heat exchange medium when the temperature difference between the material and medium is greater and for exposing a lesser volume of hydride material to the heat exchange medium as this temperature difference decreases. Specifically, the FIG. 4 structure includes a housing 70, an inlet manifold 72 coupled into one end of the housing 70, and an outlet manifold 74 coupled into the other end of the housing. Disposed within the housing 70 is a hydride material container 76 constructed in a generally frusto-conical shape with the wide end of the container disposed adjacent the inlet manifold 72 and the narrow end of the container disposed near the outlet manifold 74. A manifold 78 is coupled through the housing 70 into the container 76 for enabling introduction of hydrogen into and withdrawal of hydrogen from the container. A filter 79 is disposed in the manifold 78 at the point of coupling the manifold into the container 76. As indicated by the arrows in FIG. 4, heat exchange medium is introduced through the inlet manifold 72 to flow about the container 76 and then out the outlet manifold 74. As with the arrangement of composite FIG. 3, a greater volume of hydride material is exposed to the heat exchange medium when the heat exchange medium first enters the housing 70 and then the volume continuously decreases toward the exit end of the housing. The reasons for this have already been discussed in connection with composite FIG. 3.

FIGS. 5A and 5B show a modified version of the FIG. 4 structure in which the hydride container 75 is generally cylindrical in shape (rather than frusto-conical) and has a plurality of tapered fins 77 positioned about and extending outwardly from the container. The fins 77 are tapered to increase in width toward the exit end of a housing 67 to facilitate, at the exit end, better heat transfer between a heat exchange medium flowing through the housing and the hydride material held in the container 75. The fins 77 increase conduction of heat and thereby compensate for the decrease in temperature differential between the heat exchange medium and hydride material toward the exit end of the housing 67.

Composite FIG. 6 shows still another embodiment of a hydride storage and heat exchanger system. This embodiment includes a housing 80, an inlet manifold 82 coupled in one side of the housing 80, and an outlet manifold 84 coupled in the other side of the housing. Disposed in the housing 80 are a plurality of generally cylindrical-shaped hydride material containers 86 through 94. The containers 86 through 94 are arranged in a plurality of rows so that the axes of the containers are generally parallel with each other and generally perpendicular to the direction of flow of a heat exchange medium through the housing 80 (indicated by the arrows). Specifically, the heat exchange medium is introduced through manifold 82 into the housing 80 and flows about the containers 86 through 94 and out the outlet manifold 84.

Note in FIG. 6B that the row of containers 86 nearest the inlet manifold 82 have circumferences greater than the next row of containers 88 which, in turn, have circumferences greater than still the next row of containers 90, etc. The reason for this again is to expose the greatest volume of hydride material to the heat exchange medium as the medium is first introduced into the housing 80 and then to continuously reduce the volume of hydride material exposed as the medium travels through the housing toward the outlet manifold 84.

Hydrogen gas is introduced into and withdrawn from the containers 86 through 94 by a manifold 96 coupled through the housing 80 to one end of each of the containers. The process of storage and withdrawal of hydrogen for the composite FIG. 6 arrangement is the same as that earlier described for the FIGS. 1 through 5 arrangements.

Composite FIG. 7 shows one final embodiment of a structure for facilitating the hydrating of a hydride material. This structure includes a generally cylindrical container 100 and a conduit 102 extending through the center of the container along the cylindrical axis thereof. The conduit 102 is provided for conveying a heat exchange medium into proximity with hydride material 104 contained in the container 100. The heat exchange medium flows in the direction indicated by the arrows. A manifold 106 is coupled into the housing 100 to enable introduction into and withdrawal from the container 100 of hydrogen. A filter 108 is disposed in the manifold 106 as with the previous structures. A plurality of fins 110 are disposed about and extend outwardly from the conduit 102 as best seen in FIG. 7B. The fins 110 are tapered to gradually increase in width from the inlet end (left end) of the conduit 102 toward the outlet end (right end) of the conduit (see FIG. 7A). The fins extend into and contact the hydride material 104 and act as thermal conductors for the heat exchange medium flowing through the conduit 102. Thus, toward the outlet end of the container 100 where the fins 110 are wider, the fins enhance heat transfer between the heat exchange medium and the hydride material to offset the decrease in temperature difference between the medium and the material as the medium flows toward the outlet end. Although generally flat solid fins 110 are shown in composite FIG. 7, a variety of shapes or configurations could be employed to enhance the heat transfer characteristics between the heat exchange medium and the hydride material toward the outlet end of the container 100.

All of the embodiments described above provide for holding the hydride material in a container having a generally circular cross-section and then conveying a heat exchange medium into proximity with the container (either about the exterior of the container, through the center of the container, or both) to enable exchange of heat between the hydride material and the medium. This configuration has been found to minimize the problems of obtaining complete hydration in a fairly short period of time and of obtaining fairly complete withdrawal of hydrogen from the hydride material also in a fairly short period of time.

It is to be understood that the above-described embodiments are only illustrative of the principles of the present invention. Other embodiments may be described by those skilled in the art without departing from the spirit and scope of the invention, and the appended claims are intended to cover such embodiments.

What is claimed is:

1. A hydride storage and heat exchanger system comprising:

an elongate, cylindrical container for holding hydride material;

elongate, cylindrical heat transfer means having one side thereof in contact with said hydride material and adapted to be contacted on the other side thereof with a heat exchange fluid, said heat transfer means having a plurality of fins disposed longitudinally along the side thereof in contact with said hydride material, said fins extending outwardly from said heat transfer means in intimate contact with said hydride material;

means for introducing hydrogen into and receiving hydrogen from said container, means for directing a heat exchange medium substantially uniformly about said other side of said heat transfer means to enable exchange of heat from the heat exchange medium to the hydride material through said heat exchange means and said fins disposed thereabout.

2. A system in accordance with claim 1, wherein the heat exchange medium flows longitudinally along said other side of said heat transfer means, and wherein said fins are tapered to become wider toward the downstream end of said heat transfer means.

3. A system in accordance with claim 1, wherein said cylindrical heat transfer means comprises a conduit extending longitudinally through said container substantially along the cylindrical axis thereof, and said heat exchange medium is directed to flow through said conduit from one end to the other.

4. A method of storing hydrogen in and recovering hydrogen from a hydride material comprising the steps of:

(a) confining the hydride material in a substantially cylindrical container including an elongate, cylindrical heat exchange means having one side thereof in contact with said hydride material and adapted to be contacted on the other side thereof with a heat exchange fluid, said heat transfer means having a plurality of fins disposed longitudinally along the side thereof in contact with said hydride material, said fins extending outwardly from said heat transfer means in intimate contact with said hydride material;

(b) exposing said other side of said heat exchange means to a heat exchange medium;

(c) transferring heat between said heat exchange medium and said hydride material through said heat exchange means and the fins disposed thereon; and (d) introducing hydrogen gas into said container and receiving hydrogen gas from said container.

5. A method in accordance with claim 4, wherein said fins are tapered in their width so that the width of mutually respective members of said fins increases in a direction toward one end of said container, and wherein step (b) comprises passing the heat exchange medium about the heat exchange means in the direction in which said fins increase in width.

6. A method in accordance with claim 4, wherein said heat exchange means comprises a conduit extending through said container substantially along the cylindrical axis thereof, with said plurality of fins disposed longitudinally along the exterior surface of said conduit so that said fins project outwardly from said conduit in contact with said hydride material in said container, and wherein step (b) comprises passing said heat exchange medium through said conduit and step (c) comprises transferring heat between the heat exchange medium flowing in said conduit and the hydride material, through said conduit and the fins disposed on the exterior surface of said conduit.

* * * * *